United States Patent [19]

Gleason et al.

[11] Patent Number: 4,525,142
[45] Date of Patent: Jun. 25, 1985

[54] PROCESS FOR TREATING FLUE GAS WITH ALKALI INJECTION AND ELECTRON BEAM

[75] Inventors: Robert J. Gleason; Paul L. Feldman, both of Somerville, N.J.

[73] Assignee: Research-Cottrell, Inc., Somerville, N.J.

[21] Appl. No.: 619,371

[22] Filed: Jun. 11, 1984

[51] Int. Cl.³ ................ C01B 21/00; C01B 17/00; B01J 8/00; B01J 1/10
[52] U.S. Cl. ................ 423/235; 423/242; 423/244; 110/343; 110/345; 204/157.1 R; 204/157.1 H
[58] Field of Search .......... 423/242 A, 242 R, 244 A, 423/244 R, 235, 393, 235 A; 110/343, 345; 204/157.1 R, 157.1 H

[56] References Cited

U.S. PATENT DOCUMENTS

| | | | |
|---|---|---|---|
| 2,718,453 | 9/1955 | Beckman | 423/244 |
| 3,869,362 | 3/1975 | Machi et al. | 204/157.1 R |
| 3,976,747 | 8/1976 | Shale et al. | 423/244 |
| 4,004,995 | 1/1977 | Machi et al. | 204/157.1 H |
| 4,105,744 | 8/1976 | Erdoess et al. | 423/244 |
| 4,372,832 | 2/1983 | Bush | 204/157.1 R |

*Primary Examiner*—Gregory A. Heller
*Attorney, Agent, or Firm*—Kerkam, Stowell, Kondracki and Clarke

[57] ABSTRACT

A process uses limestone injection into a combustion boiler burning pulverized coal or liquid hydrogen fuel. Effluent gas from the boiler is humidified and cooled to below 200° F. During the humidifying and cooling step, sulfur dioxide removal occurs in addition to that which takes place in the combustion zone of the boiler. The effluent gas and unreacted alkali is then fed into an electron beam irradiation chamber which produces energetic conditions for rapid reaction of sulfur dioxide and nitrogen oxides in the presence of water vapor. The remaining unreacted alkali reacts rapidly and in-situ with the sulfuric acid and nitric acid formed in the electron beam chamber.

12 Claims, 1 Drawing Figure

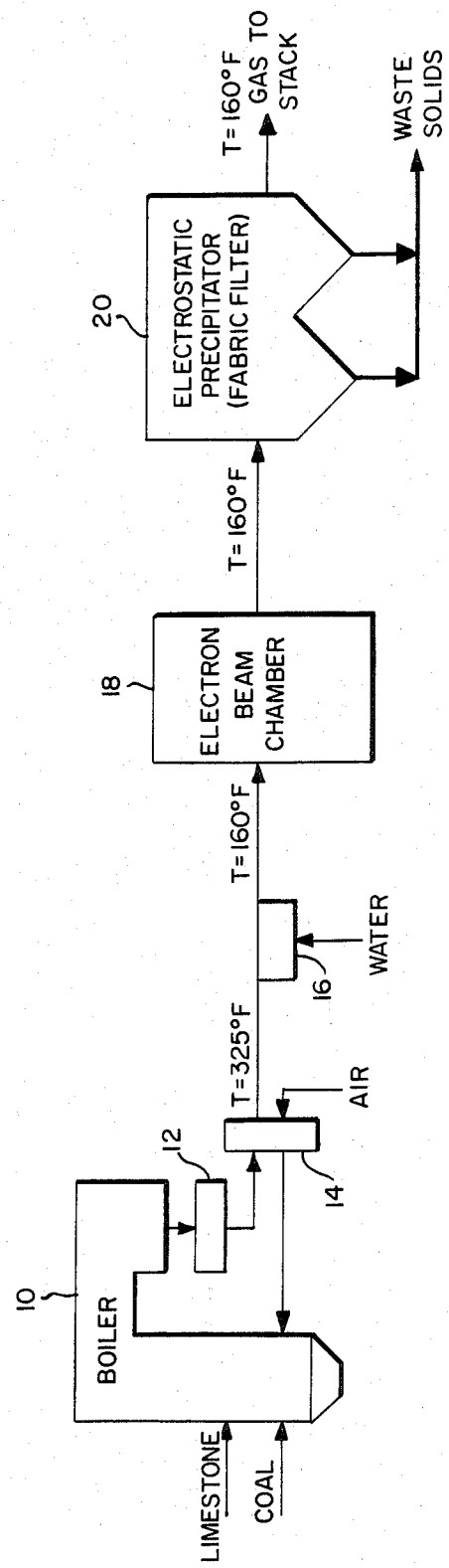

PROCESS FOR TREATING FLUE GAS WITH ALKALI INJECTION AND ELECTRON BEAM

BACKGROUND OF THE INVENTION

The present invention relates to a process for treating flue gas with injection of alkali solid for removal of sulfur oxides and nitrogen oxides.

An extensive amount of effluent gas is generated from the burning of various fuels. The adverse impact on human health of certain of the pollutants has only relatively recently begun to be appreciated. Specifically, sulfur dioxide ($SO_2$) and nitrogen oxides of various forms ($NO_x$) are believed to be especially objectionable. Although particulates such as ash and dust are also deleterious to the human body, these solid pollutants are usually easier to remove than sulfur dioxide and nitrogen oxides.

The problems of sulfur dioxide emissions from industrial plants has become more significant in recent years due to a trend away from oil and towards coal. Coal generally has a greater amount of sulfur than oil or fuels refined from oil.

The burning of coal, especially high-sulfur coals, may pose environmental problems in addition to adversely affecting human health. Specifically, if the effluent gases from the burning of relatively high-sulfur fuels are not properly treated, the sulfur dioxide released into the atmosphere causes "acid rain". Basically, the sulfur dioxide reacts to form sulfuric acid which falls with rain.

Various techniques have been used or proposed to remove sulfur dioxide and nitrogen oxides from effluent gas.

Wet scrubbing processes use an aqueous alkali solution which is sprayed into the effluent gas as it passes through a chamber or tower. Relatively large quantites of water are used in the injected slurry in order to saturate the effluent gases. In addition to the disadvantage of requiring large amounts of water, the wet scrubbing processes generate a large amount of waste product solutions which are hard to dispose of without causing water pollution. Further, scaling or solidification of the reaction products occurs on various parts of the wet scrubbing system causing high maintenance costs.

In contrast to the wet scrubbing or washing processes, a number of dry scrubbing processes such as spray drying have been used. The spray drying process is superficially similar to wet scrubbing processes in that water is used to inject an alkali reagent such as lime or limestone into the stream of effluent gases. However, unlike the wet scrubbing or washing processes, the spray drying process uses a relatively small quantity of water which will evaporate after it has carried the reagent into a chamber through which the effluent gas passes. From the chamber the effluent gases pass into a particulate collection means such as a fabric filter or electrostatic precipitator. The particulate collection means removes the solid products of the reaction between the reagent and the pollutant such as sulfur dioxide.

Although the spray drying process has been useful in removing pollutants without being subject to the disadvantages of the wet scrubbing or washing processes, the spray drying process has other disadvantages. Specifically, the spray drying process generally requires a higher stoichiometric ratio of reagent (usually calcium from lime or limestone) to sulfur oxides than is the case in the wet scrubbing processes. Typically, in order to achieve adequate removal of sulfur dioxide from effluent gases of high sulfur content coal the stoichiometric ratio of reagent (calcium) content to sulfur oxides must be over 2 to 1. However, the solids content of the injected slurry in a spray drying process is limited to less than 30%, preferably under 25%, to avoid damaging the pump which is used to inject the slurry into the spray dryer. Accordingly, one can not raise the stoichiometric ratio of reagent to sulfur oxides unless the water content is increased. Yet the water content must be limited in order to keep the process dry and avoid the disadvantages of the washing processes discussed above. These design tradeoffs have restricted the use of the spray drying processes to limited applications.

Pollutants have additionally been removed from effluent gases by the use of an ionizing radiation. Such systems use electron beam, ultraviolet light, gamma radiation, or the like to ionize sulfur dioxide and nitrogen oxides in the effluent gases. Although the reaction mechanism for the oxidation of sulfur dioxide and nitrogen oxides using this technique is very complex and not fully understood, the ionization caused by electron beam or other ionizing radiation converts the sulfur dioxide and nitrogen oxides to acid mist at low temperatures and/or solid particles at higher temperatures.

Unfortunately, the ionizing radiation method usually requires high dosages (two to eight megarads) to satisfactorally remove the pollutants. Additionally, the acid mist has the tendency to corrode the electron beam or other irradiation chamber.

An adaptation of the ionizing radiation process as disclosed in U.S. Pat. No. 3,869,362 of Machi et al., issued on Mar. 4, 1975, may use a preliminary treatment step such as washing the effluent gases with an acqueous alkali solution in a tower prior to radiating the gases.

U.S. Pat. No. 4,372,832 issued to John R. Bush on Feb. 8, 1983, assigned to the assignee of the present invention, and entitled "Pollution Control by Spray Dryer and Electron Beam Treatment" discloses a method for treating effluent gases by use of a spray dryer followed by electron beam radiation. That patent, which is hereby incorporated by reference, introduces a reagent such as lime with water into the spray dryer which is located between an air preheater (downstream from the boiler) and the electrom beam reactor. Particulate collection occurs after the electron beam reactor.

Further, the process for sulfur dioxide removal from fossil fuel combustion where limestone is injected into the combustion zone of a boiler has been investigated and reported in the literature for about 10 to 15 years. This boiler injection process, often called LIMB, has demonstrated sulfur dioxide removal of 50% in flue gas emission where limestone stoichiometries (ratio of limestone reagent to sulfur dioxide) of 200 to 300% are employed.

Such excess limestone injection has resulted in high levels of particulate emission to create a greater demand on the particulate collection or fly ash removal unit of the system. In other words, the injection of excess limestone greatly increases the amount of particulates in the effluent gas. Existing boiler systems have limited capacity in particulate removal as dictated by the original system design. Accordingly, conversion of an in-place boiler system to the LIMB desulfurization causes excess emissions of particles. However, corrective measures for particulate removal can be overcome by adding capacity to collecting apparatus such as electrostatic precipitators or fabric filters.

As an alternative to the expensive measures of increasing particulate removal capacity the present inventors have developed a method of reduced temperature operation for particulate collection wherein limestone is injected into the boiler in an amount at least sufficient to react with the sulfur trioxide. Thereafter, the gas stream is cooled to a temperature below 250° F. and then subjected to particle collection. That system is disclosed in the present inventors' U.S. patent application Ser. No. 599,792 filed on Apr. 13, 1984 and entitled "Method for Reduced Temperature Operation of Flue Gas Collectors." That application is a C-I-P of U.S. patent application Ser. No. 520,620 filed on Aug. 5, 1983 by the present inventors and having the same title as U.S. patent application Ser. No. 599,792. Both of these applications, which are assigned to the assignee of the present application, are hereby incorporated by reference.

A modification of the boiler injection of limestone has been the enhancement of sulfur dioxide removal by use of a spray dryer.

U.S. patent application Ser. No. 575,651 entitled "Limestone Injection Multiburning (LIMB) Post Combustion $SO_2$ Removal System" filed by the present inventors on Jan. 31, 1984 as a continuation-in-part of the above discussed application Ser. No. 520,620 discloses a limestone injection process including controlling of the particles size of injected limestone or hydrated lime, humidifying the combustion gases, and increasing reaction time between humidification and particle collection. That application, which is assigned to the assignee of the present application, is hereby incorporated by reference.

OBJECTS AND SUMMARY OF THE INVENTION

Accordingly, it is an object of the present invention to provide a new and improved process for treating flue gas.

A more specific object of the present invention is to provide a flue gas treatment method which maximizes the removal of sulfur dioxide.

A further object of the present invention is to provide a process for treating flue gas wherein much less of the injected reagent is wasted.

Still another object of the present invention is to provide a process for treating flue gas wherein reagent may be used to minimize corrosion to some parts of the system.

Yet another object of the present invention is to provide a process for treatment of flue gas including various stages which optimize the operation of the next stage in the treatment process.

The above and other objects of the present invention are realized by a process for removing pollutants including at least sulfur oxides and/or nitrogen oxides from effluent gas, the steps comprising: injecting alkali reagent into the combustion zone of a combustion boiler fired by fuel selected from the group of pulverized coal, liquid hydrocarbon, or mixtures thereof, some of the alkali reagent reacting with sulfur oxides in the effluent gas to form a reaction product; passing the effluent gases and the unreacted alkali out of the combustion boiler and into a cooling stage and cooling the effluent gases and unreacted alkali reagent to below 200° F. such that an additional amount of the alkali reagent reacts with sulfur oxides in the effluent gas to form a reaction product; passing the cooled effluent gases and remaining unreacted alkali reagent into an irradiation chamber; irradiating the effluent gases and unreacted alkali reagent with ionizing radiation in the irradiation chamber causing the unreacted alkali reagent to convert gaseous sulfur oxides and/or nitrogen oxides into mist and/or solid particles; and subjecting the irradiated effluent gas to particulate collection in a particular collection device. The cooling of the effluent gases is accomplished by evaporative cooling of water injected into the effluent gases down stream from the combustion boiler and up stream from the irradiation chamber. The process removes at least 90% of sulfur dioxide and nitrogen oxide gas pollutants in the effluent gases. The alkali reagent is injected only into the combustion boiler. The temperature of the effluent gases fed to the particulate collection devices is below 200° F. Between 50 to 60% of the sulfur dioxide in the effluent gases is reacted in the combustion boiler, 25 to 40% of the sulfur dioxide is reacted between the evaporative cooler and the collector, and 60% of the remaining unreacted sulfur dioxide is converted to sulfur trioxide in the irradiation chamber. At least 90% of the unreacted nitrogen oxides are converted to nitric acid in the irradiation chamber. The alkali reagent consists essentially of a member of the group of: lime, limestone, sodium compounds, magnesium compounds, or mixtures thereof. The ionizing radiation may be electron beam irradiation. The particulate collection includes electrostatic precipitation The alkali reagent reacts to form $CaSO_3$ in the combustion boiler and the cooling stage and reacts to form $CaSO_4$ in the irradiation chamber.

BRIEF DESCRIPTION OF THE DRAWING

The above and other features of the present invention will be more readily understood when the following detailed description is considered in conjunction with the accompanying drawing wherein:

The drawing shows a schematic representation of the process of the present invention.

DETAILED DESCRIPTION

With reference to the drawing, a preferred process according to the present invention will be described in detail. In particular the drawing shows a boiler 10 into which coal and limestone are injected. Specifically, the coal and limestone are injected into a combustion zone within the boiler 10. Instead of feeding pulverized coal into the boiler 10, liquid hydrocarbon fuel could alternately be used. Instead of limestone as the alkali reagent injected into the boiler, lime, sodium compounds, magnesium compounds, or mixtures thereof could be used.

The injection of the limestone in with the pulverized coal into the combustion boiler 10 results in the following reactions:

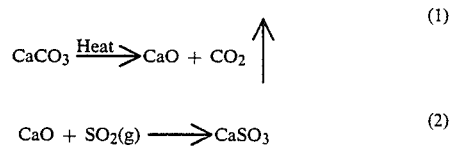

Because excess limestone is injected into the boiler, less than 50% of the CaO is consumed in the combustion zone. The unreacted alkali is carried in the effluent gas through heat exchanger 12 and air preheater 14. The effluent gas carrying the $CaSO_3$ reaction product and unreacted alkali is at a temperature of about 325° F. The gas and associated particles are passed into a cooling stage 16 which is used for conditioning the effluent gas for further operation and, additionally, consuming additional amounts of the unreacted alkali.

As shown in the drawing the cooling stage 16 uses the direct addition of water to provide process conditions where the following reactions occur:

$$CaO + H_2O \longrightarrow Ca(OH)_2 \quad (3)$$

$$H_2O + Ca(OH)_2 + SO_2 \longrightarrow CaSO_3 + 2H_2O \quad (4)$$

or $$CaO + SO_2 \xrightarrow{H_2O} CaSO_3 \quad (5)$$

As in the boiler injection step, not all the CaO entering this humidification and cooling stage is consumed. The degree of cooling, particulate concentration, and residence time for reaction will all influence the amount of $SO_2$ which is removed. It is anticipated that as much as 25 or 40% additional removal can be achieved in the temperature range of 160° to 190° F. for the effluent gases leaving the cooling step.

To further use the remaining unreacted alkali, the effluent gases are passed into an ionizing irradiation chamber such as electron beam chamber 18. As shown, the temperature of the gas entering the electron beam chamber 18 is 160° F. or approximately 71° C. This temperature should at least be below 100° C. and it is highly preferred to have the cooling stage 16 cool the gas to between about 60° C. and 75° C. Inasmuch as the electron beam reactor 18 will remove pollutants more efficiently at lower temperatures and higher moisture levels, it will be readily appreciated that the cooling stage 16 has conditioned the gas for optimum operation of the electron beam chamber 18. Accordingly, dosages of between about 0.5 and 2.0 megarads may be used for the electron beam treatment instead of the higher dosages often required. The electron energy should be about 0.5 to 1.0 mev.

The unreacted alkali reagents which enter into the electron beam chamber 18 will react with the solid particles and/or acid mist formed within the electron beam reactor. That is, that portion of limestone injected into the boiler 10 which has not yet reacted with the pollutants will react with the acid mist and/or solid particles formed by application of the electron beam to the sulfur dioxide and nitrogen oxides. This greatly optimizes the efficiency of the reagent usage and helps to keep the electron beam chamber dry, thereby minimizing corrosion to the electron beam chamber. Additionally, the acid mist and/or solid particles formed by the ionizing radiation reacts with the reagent in-situ within chamber 18, thereby avoiding the necessity of having a separate stage in the system to deal with the acid mist and/or solid particles formed by the radiation.

The reactions which occur within the electron beam chamber are quite complex and not fully understood, but are believed to include the following reactions:

$$O_2 + 2SO_2 \xrightarrow{\text{E-beam}} 2SO_3 \quad (6)$$

$$O_2 + 2NO + H_2O \xrightarrow{\text{E-beam}} 2HNO_3 \quad (7)$$

$$HNO_3 + CaO \longrightarrow Ca(NO_3)_2 + H_2O \quad (8)$$

$$SO_3 + CaO \longrightarrow CaSO_4 \quad (9)$$

The effluent gas from the electron beam chamber 18 is passed to a particulate collection device such as an electrostatic precipitator 20. Alternately, a fabric filter could be used. The temperature of the gas passed to the electrostatic percipitator will preferably be below 200° F. and, as shown in the figure, a preferred value of approximately 160° F. is used. The lower temperature and higher moisture operation of the electrostatic percipitator 20 (or fabric filter) results in more efficient operation in particulate collection.

Note that the relatively low dosages from the electron beam chamber 18 will only minimally increase the temperature of the effluent gas. The temperatures shown on the drawings are somewhat idealized in that the temperature of the gas leaving the electron beam chamber 18 will be at least some what higher than the temperature of the gas entering the chamber.

With the present process, a range of 50 to 60% sulfur dioxide removal (i.e., reaction with the CaO) will occur in the boiler 10. An additional 25 to 40% of the sulfur dioxide will react with the CaO in the cooling and humidification stage 16 and the collector 20. Approximately 60% of the unreacted sulfur dioxide can be converted into sulfur trioxide and 90% of the nitrogen oxides can be converted to nitric acid in the electron beam chamber 18. The flue gas leaving the particulate collection system is substantially stripped of NO, $NO_2$, and $SO_2$. Virtually all of the solid reaction products, unused alkali, and fly ash are removed in the particulate collection device such as electrostatic precipitator 20.

The overall effect of the present combined system approach is to reduce the sulfur dioxide and nitrogen oxide concentrations by greater than 90%. The efficiency of acid gas removal can be enhanced to high levels by adjusting the reaction time, temperature, and residual alkali to attain the maximum effect. Most advantageously, the reagent can be injected at a single stage in the process (i.e., at the boiler 10) and be used to react with the sulfur dioxide under 3 conditions at 3 separate stages: under heat within the boiler 10, with water at cooling/humidfying stage 16, and under ionizing radiation in E-beam chamber 18. As noted in the equations above, the first 2 conditions lead the sulfur dioxide to form $CaCO_3$, whereas the last condition leads to $CaSO_4$.

Although the present description has included various details, it is to be understood that these are for illustrative purposes only. Various modifications and adaptations will be readily apparent to those of ordinary skill in the art. Accordingly, the scope of the present invention should be determined by reference to the claims appended hereto.

What is claimed is:

1. A process for removing pollutants comprising either sulfur oxides or nitrogen oxides or both from effluent gas, the steps comprising:
    (a) injecting alkali reagent into the combustion zone of a combustion boiler fired by fuel selected from the group of pulverized coal, liquid hydrocarbon, or mixture thereof, some of said alkali reagent reacting with sulfur oxides in the effluent gas to form a reaction product;

(b) passing said effluent gases and said unreacted alkali out of said combustion boiler and into a cooling stage and cooling said effluent gases and unreacted alkali reagent to below 200° F. such that an additional amount of said alkali reagent react with sulfur oxides in the effluent gas to form a reaction product;

(c) passing the cooled effluent gas and remaining unreacted alkali reagent into an irradiation chamber;

(d) irradiating the effluent gas and unreacted alkali reagent with ionizing radiation in the irradiation chamber causing said unreacted alkali reagent to convert gaseous either sulfur oxides or nitrogen oxides or both into either mist or solid particles or both; and (e) subjecting the irradiated effluent gas to particulate collection in a particulate collection device.

2. The process of claim 1 wherein the cooling of the gas is accomplished by evaporative cooling of water injected into the effluent gas downstream from said combustion boiler and upstream from said irradiation chamber.

3. The process of claim 2 wherein the process removes up to or at least 90% of sulfur dioxide and nitrogen oxides gas pollutants in the effluent gas.

4. The process of claim 3 wherein said alkali reagent is injected only into said combustion boiler.

5. The process of claim 4 wherein the temperature of the effluent gas fed to said particulate collection device is below 200° F.

6. The process of claim 5 wherein 50 to 60% of the sulfur dioxide in the effluent gas is reacted in the combustion boiler, 25 to 40% of the sulfur dioxide is reacted between the evaporative cooler and the collection device, and 60% of the remaining unreacted sulfur dioxide is converted to sulfur trioxide in said irradiation chamber.

7. The process of claim 6 wherein at least 90% of unreacted nitrogen oxides are converted to nitric acid in said irradiation chamber.

8. The process of claim 7 wherein said alkali reagent consists essentially of a member of the group of:
lime,
limestone,
sodium compounds,
magnesium compounds,
or mixtures thereof.

9. The process of claim 8 wherein said ionizing radiation is electron beam irradiation.

10. The process of claim 9 wherein said particulate collection includes electrostatic precipitation.

11. The process of claim 2 wherein said alkali reagent consists essentially of a member of the group of:
lime,
limestone,
sodium compounds,
magnesium compounds,
or mixtures thereof,
and wherein said ionizing radiation is electron beam irradiation.

12. The process of claim 2 wherein said alkali reagent reacts to form $CaSO_3$ in said combustion boiler and in said cooling stage and reacts to form $CaSO_4$ in said irradiation chamber.

* * * * *